United States Patent Office 3,427,913
Patented Feb. 18, 1969

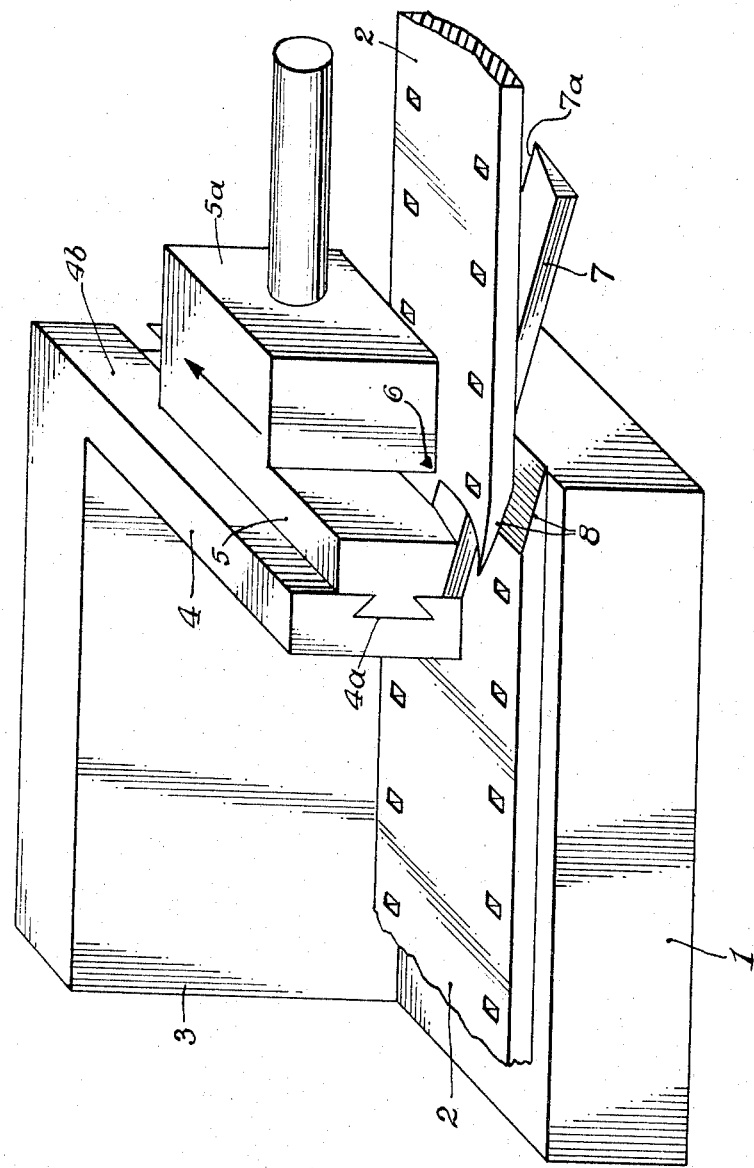

3,427,913
FILM CUTTING DEVICE
Ernst Hammann, Kirchzellerstrasse 105,
Amorbach, Germany
Filed Oct. 26, 1967, Ser. No. 678,394
Claims priority, application Germany, Nov. 9, 1966,
H 60,952
U.S. Cl. 83—176
Int. Cl. B26d 7/14, 5/08
2 Claims

ABSTRACT OF THE DISCLOSURE

A film cutting device in which the two ends of the film strip produced by the cutting operation are at the same time prepared for splicing by providing a cutting blade which is arranged inclined to the plane of the film and moves transversely of the film so that the film ends produced have beveled edges of a length which is a multiple of the thickness of the film.

---

The invention relates to a film cutting device which in addition to cutting a film strip simultaneously prepares the thus produced two film ends for splicing.

Devices of this kind sever a film strip, for instance, by means of a knife and prepare splicing surfaces at the two film ends by means of a miller, a scraper, a file or a grinding tool.

These prior devices have the disadvantage that they produce film chips or dust when preparing the film in the indicated manner. Such chips or dust particles, respectively, must be carefully removed from the cutting surfaces so as to assure a satisfactory splicing of the film. A rejoining of the film strip in the place of separation has heretofore not been possible. At least one picture frame was lost. A film strip cut in this manner could only be rejoined in the same place with the aid of additional adhesive strips, and a greater thickness of the film in the splicing region was inevitable. Known devices of this kind by which the two film ends to be rejoined can be cemented or welded together with their edges either smooth or serrated, also gives rise to an increase in thickness of the splicing regions and the greater thickness is not only noticeable during the projection of the film, but in these regions the film is also easily torn at its edges.

It is the object of the invention to overcome the aforementioned disadvantages and to create a tool which in severing the film strip produces cutting surfaces which are ready to serve as splicing areas without requiring any further treatment.

This is accomplished according to the invention by a cutting device the knife blade of which is inclined with respect to the plane of the film and is movably guided transversely to the longitudinal direction of the film. The inclination of the knife blade can be so selected that the surface of the cut measured with respect to the lengthwise direction of the film amounts to a multiple of the thickness of the film.

A further development of the inventive concept provides for a film depressing member arranged in front of the knife blade carrier so that both parts glide simultaneously transversely over the film strip. Preferably, this film depressing member forms together with the stationary film supporting surface a passage which corresponds to the thickness of the film after making allowance for the usual tolerances. The film depressing member is arranged above the knife blade at a distance equal to at most the thickness of the film.

The invention will be further described by way of an exemplary embodiment and with reference to the accompanying drawing in which the single figure is a perspective view of the device according to the invention.

Referring to the drawing, on a horizontl film track 1 is disposed a film strip 2 to be cut in accordance with the invention. A vertical rear wall 3 extending along the rear edge of the film track 1 forms an abutment for the rear edge of the film strip 2 and is provided with a guide 4 for a knife blade holder 5. The guide 4 extends at a right angle to the rear wall 3 and horizontally forwardly over the film track 1 and spaced therefrom. The knife holder 5 is slidably mounted in a horizontal dove-tailed guide groove 4a provided in the vertical face 4b of the guide 4. In front of a knife blade 7 which is arranged in an inclined position so as to perform a wedge cut is arranged a film depressing member 5a which is adapted to be moved simultaneously with the knife blade 7 over the film track 1 in the direction of the arrow. The cutting edge 7a of the knife blade 7 is arranged on the rear edge of the inclined blade 7 and is moved from the front edge of the film track 1 toward the rear edge thereof. The space between the film depressing member 5a and the knife blade 7 is preferably not greater than the thickness of the film and is formed as a passage 6 for the already cut off portion of the film strip. This film passage 6 lessens the danger that the film strip 2 slips undivided on top of the knife blade 7.

In order to obtain lasting splicings which are not visible when copying or projecting the film, it is advisable to select the inclination of the knife blade 7 so that when the film is cut in a wedge-like manner the cutting surfaces 8 of the two film ends thus produced measure each about ten times the thickness of the film strip, measured in the longitudinal direction of the film.

What I claim is:

1. A device for simultaneously cutting a film strip and preparing the two end surfaces thus produced for splicing, including a knife blade with a cutting edge which is arranged inclined with respect to the plane of the film strip to be cut, the inclination of said knife being so selected that when severing the film strip in a wedge-like manner the cutting surface produced in longitudinal direction of the film strip will be a multiple of the thickness of the film, a knife blade carrier, means for guiding said knife blade carrier transversely to the longitudinal direction of the film strip and above the same while performing the cutting operation, and a film depressing member in front of said knife blade carrier and movable together with the latter over the film strip.

2. A device according to claim 1, in which said film depressing member is arranged spaced from said knife blade a distance which at the most amounts to the thickness of the film strip so that a passage is produced for the already cut section of the film strip.

References Cited

UNITED STATES PATENTS

| 324,633 | 8/1885 | Ames | 83—581 X |
| 570,180 | 10/1896 | McCall | 83—581 |
| 571,677 | 11/1896 | Murdoch | 83—581 |

FOREIGN PATENTS 101,389  9/1916  Great Britain.

JAMES W. MEISTER, *Primary Examiner.*

U.S. Cl. X.R.
83—581, 614